United States Patent
Gossweiler, III et al.

(10) Patent No.: US 8,612,767 B2
(45) Date of Patent: *Dec. 17, 2013

(54) OBSCURING AN ACCELEROMETER SIGNAL

(75) Inventors: Richard Carl Gossweiler, III, Sunnyvale, CA (US); James Brooks Miller, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/531,966

(22) Filed: Jun. 25, 2012

(65) Prior Publication Data

US 2013/0111597 A1    May 2, 2013

Related U.S. Application Data

(63) Continuation of application No. 13/281,766, filed on Oct. 26, 2011, now Pat. No. 8,214,910.

(51) Int. Cl.
*G06F 21/00* (2013.01)
*G06F 21/82* (2013.01)
*G06F 21/60* (2013.01)

(52) U.S. Cl.
CPC ............... *G06F 21/82* (2013.01); *G06F 21/60* (2013.01)
USPC .................. 713/183; 726/26; 455/1

(58) Field of Classification Search
None
See application file for complete search history.

(56) References Cited

U.S. PATENT DOCUMENTS

| | | | |
|---|---|---|---|
| 6,721,738 | B2 | 4/2004 | Verplaetse et al. |
| 7,688,306 | B2 | 3/2010 | Wehrenberg et al. |
| 7,996,682 | B2 | 8/2011 | Schutz et al. |
| 2004/0064711 | A1 | 4/2004 | Fernando et al. |
| 2007/0101148 | A1 | 5/2007 | Schutz et al. |
| 2009/0153490 | A1 | 6/2009 | Nymark et al. |
| 2009/0169018 | A1 | 7/2009 | Deisher |
| 2010/0033422 | A1* | 2/2010 | Mucignat et al. ............ 345/156 |

OTHER PUBLICATIONS

Terrazas, M., "Georgia Tech Turns iPhone Into spiPhone." Georgia Institute of Technology Newsroom, Oct. 17, 2011. <http://www.gatech.edu/newsroom/release.html?nid=71506>, 3 pages.

Cai, L., "TouchLogger: Inferring Keystrokes on Touch Screen From Smartphone Motion," In Proceedings of the USENIX Workshop on Hot Topics in Security (HotSec), Aug. 9, 2011, San Francisco, CA, 6 pages.

(Continued)

*Primary Examiner* — Matthew Henning
(74) *Attorney, Agent, or Firm* — Morris & Kamlay LLP (57) ABSTRACT

The present disclosure presents techniques for determining when to obscure an accelerometer signal from an accelerometer of a mobile device. The techniques include determining whether a user has been prompted to provide sensitive input data to the mobile device using an input device of the mobile device. When the user has been prompted to provide sensitive input data, the technique includes obscuring a portion of an accelerometer signal outputted from an accelerometer, and receiving the sensitive input data from the user at the input device while the accelerometer signal is obscured. In some embodiments, the accelerometer signal can be obscured by (i) switching the accelerometer 216 off, (ii) inserting a random noise signal into the accelerometer signal, (iii) masking the low-order bits of the accelerometer signal, (iv) passing the accelerometer signal through a filter, (v) actuating a vibrator of the mobile device, and/or (vi) otherwise degrading the accelerometer signal.

26 Claims, 8 Drawing Sheets

(56) References Cited

OTHER PUBLICATIONS

Cai, L., "Defending Against Sensor-Sniffing Attacks on Mobile Phones," In Proceedings of the 1st ACM Workshop on Networking, Systems, and Applications for Mobile Handhelds (MobiHeld '09), ACM, 2009, New York, NY, pp. 31-36.

Cai et al., "Defending Against Sensor-Sniffing Attacks on Mobile Phones", Proceedings of the 1st ACM Workshop on Networking, Systems, and Applications for Mobile Handhelds, Mobiheld 2009, Aug. 17, 2009.

Cai et al., "TouchLogger: Inferring Keystrokes on Touch Screen From Smartphone Motion", Proceedings of the 6th Usenix Conference on Hot Topics in Security: Series Hotsec 2011, Aug. 9, 2011.

International Search Report, "for International application No. PCT/US2012/061929", mailed Jan. 30, 2013.

Schlegel et al., "Soundcomber: A Stealthy and Context-Aware Sound Trojan for Smartphones", Proceedings of the 18th Annual Network & Distributed System Security Symposium (NDSS 2011), Feb. 9, 2011.

\* cited by examiner

OBSCURING AN ACCELEROMETER SIGNAL

CROSS-REFERENCE TO RELATED APPLICATIONS

This application is a continuation of U.S. patent application Ser. No. 13/281,766 filed on Oct. 26, 2011. The entire disclosure of the above application is incorporated herein by reference.

FIELD

The present disclosure is directed to techniques for obscuring an accelerometer signal in a mobile device.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

A "mobile device" generally refers to a computing device having user interface, a display, and a processor. For example, the mobile device may be a mobile phone, tablet computing device, global positioning system transceiver, and the like. Mobile devices may selectively connect to a network such as the Internet and/or a mobile telephone network. A user may input information, e.g., text, to the mobile device via a user interface (or "character layout") such as a keyboard and/or a number pad. Due to size constraints, however, mobile devices may include a partial QWERTY-based physical keyboard. Additionally or alternatively, mobile devices may include touch displays, e.g., capacitive sensing displays, which both display information to the user and receive input from the user. For example, these mobile devices may display a character layout to the user similar to the partial QWERTY-based keyboard or number pad.

Mobile devices are increasingly being used to store and access sensitive user data. For example, users may store passwords and/or account numbers on their mobile devices. In another example, users may use their mobile devices to access healthcare records, bank accounts, internal corporate emails, and other highly private records. It is not a secret that there are malicious interlopers who wish to obtain sensitive user data by accessing these mobile devices, or to intercept the sensitive user data as it is being transmitted over a network. These interlopers use various techniques to obtain the sensitive user data stored in the mobile device. One such technique that an interloper may implement is to monitor an accelerometer signal outputted by an accelerometer of the mobile device to determine a location at which user input was provided.

SUMMARY

According to various embodiments of the disclosure, a computer-implemented technique is disclosed. The technique can include determining, at a mobile device, whether a user has been prompted to provide sensitive input data to the mobile device using an input device of the mobile device. When the user has been prompted to provide sensitive input data to the mobile device, the technique can include obscuring a portion of an accelerometer signal output from an accelerometer of the mobile device, and receiving the sensitive input data from the user while the portion of the accelerometer signal is obscured.

According to various embodiments of the disclosure, a mobile device is disclosed. The mobile device can include an input device having a physical interface configured to receive input data from a user, an accelerometer module that outputs an accelerometer signal and a processor in communication with the input device and the accelerometer module. The processor can be configured to: determine whether the user has been prompted to provide sensitive input data to the mobile device using the input device, and when the user has been prompted to provide the sensitive input data to the mobile device, to effect obscuring of a portion of an accelerometer signal for a period during which the user is providing the sensitive input data.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
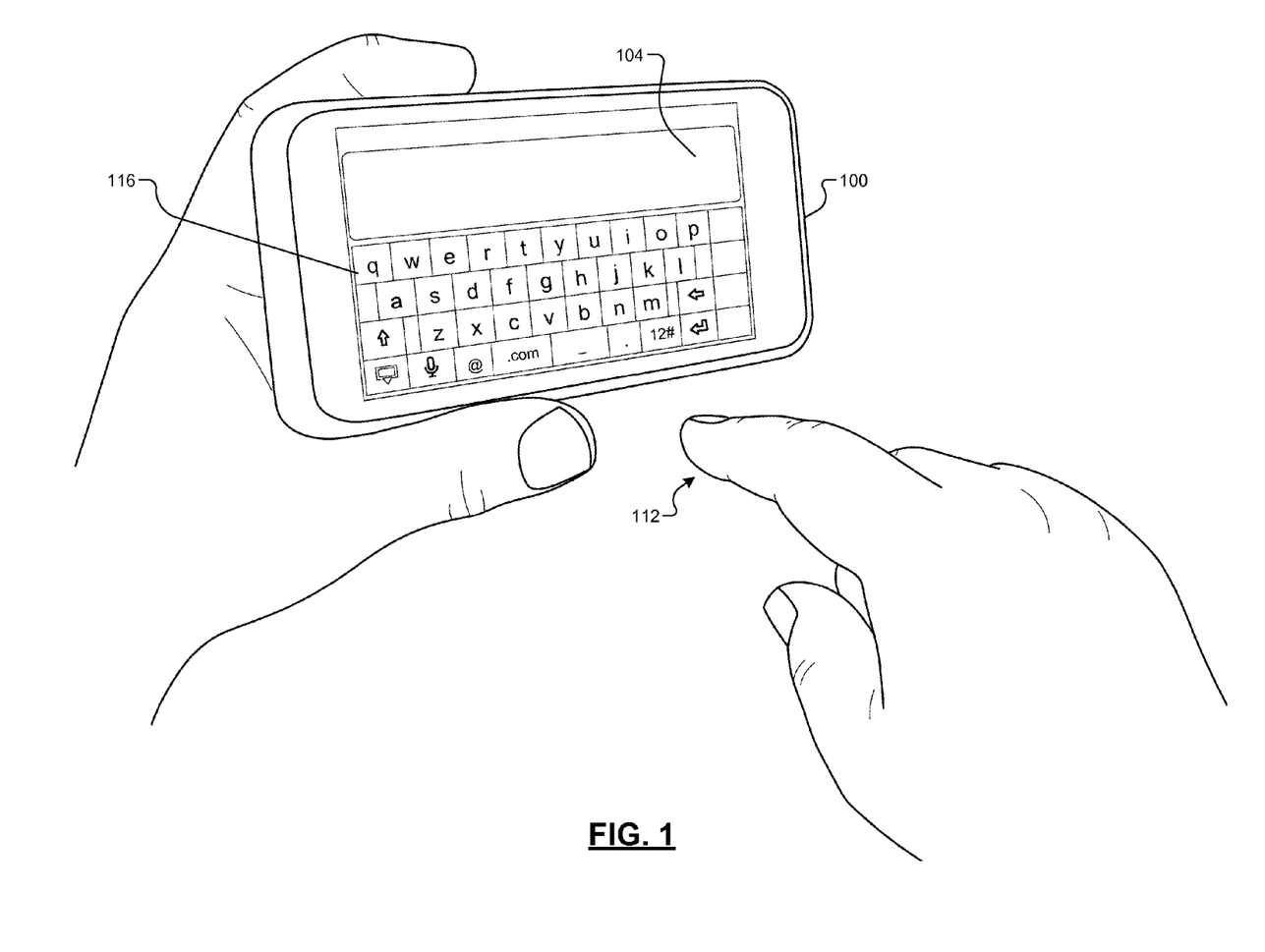
FIG. 1 illustrates an example of a user interacting with a mobile device according to some implementations of the present disclosure.

Referring now to FIG. 1, an example of a mobile device 100 is shown. The mobile device 100 may be a mobile phone, a tablet computer, or the like. The mobile device 100 generally includes a display 104. For example, the display 104 may be a touch display, such as a capacitive sensing display. The mobile device 100 may additionally or alternatively include a physical character layout, e.g., a partial QWERTY-based keyboard 116 or a number layout (not shown). The touch display 104 may display information to a user and receive input from the user. For example, the user may input information to the mobile device 100 via the touch display 104 using one or more fingers 112.

Figure 2:
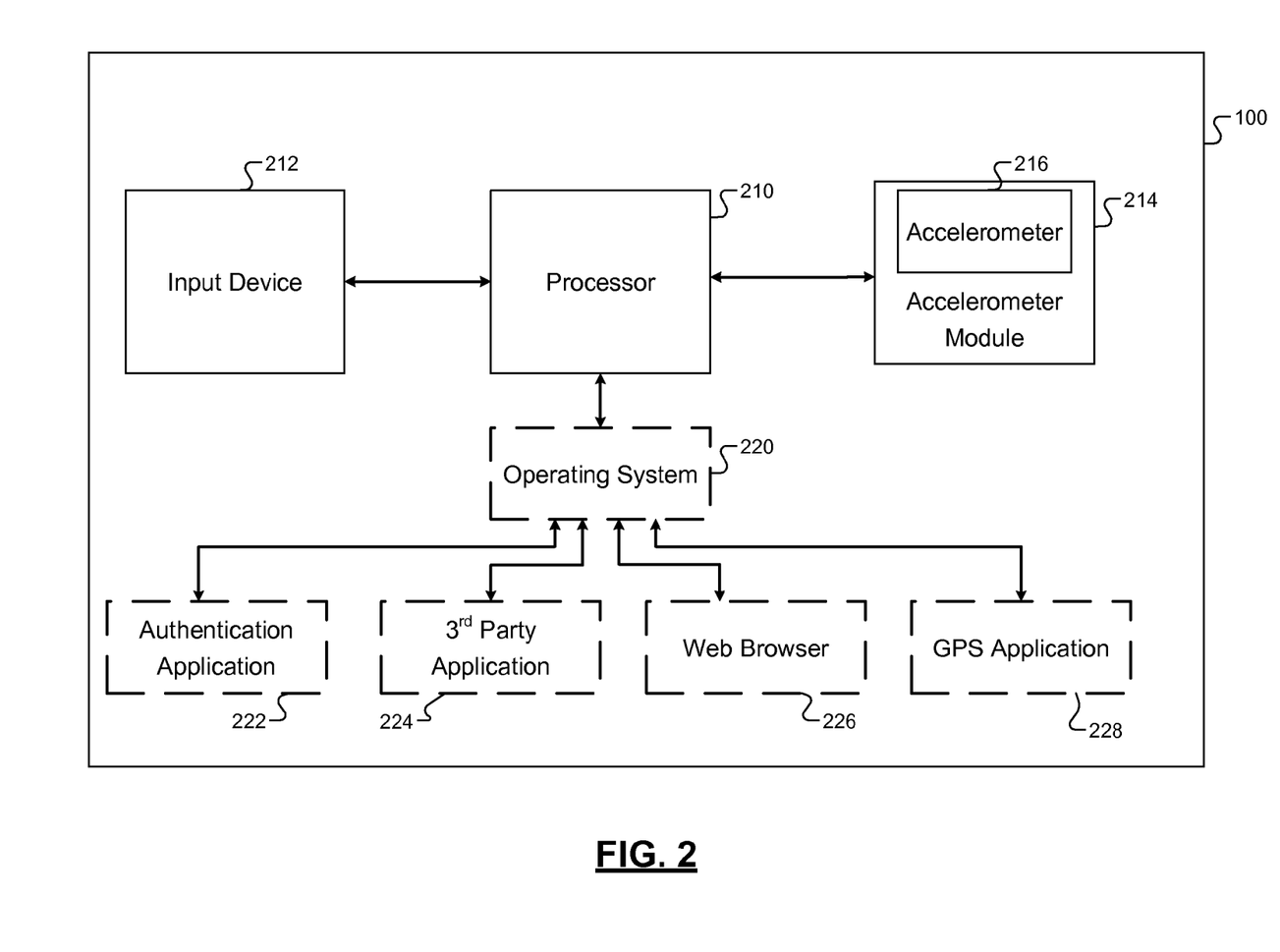
FIG. 2 is a functional block diagram of the mobile device of FIG. 1 according to some implementations of the present disclosure.

Referring now to FIG. 2, the mobile device 100 of FIG. 1 can include a processor 210, an input device 212, and an accelerometer module 214 which includes an accelerometer 216. It is appreciated that the foregoing set of components is non-exhaustive and not intended to be limiting. For example the mobile device 100 may include a microphone, an audio output device, and/or one or more antennas for communicating with, for example, a Wi-Fi base station, a cell tower, or another device.

The processor 210 can be configured to execute one or more applications. For instance, the processor 210 can execute an operating system 220. The operating system 220 may execute a plurality of other applications, including, for example only, an authentication application 222, one or more third party applications 224, a web browser application 226, and a Global Positioning System (GPS) application 228. It is appreciated that the foregoing list is provided for explanation purposes only. Further, while the mobile device 100 is illustrated as having one processor 210, it should be appreciated that multiple processors can execute the operating system and/or the other applications.

The input device 212 provides an interface for a user to interact with the mobile device 100. For instance, the input device 212 may include a touch display 104 that displays a QWERTY keyboard or a number pad, and/or a QWERTY-based keyboard. The user utilizes the input device 212 to provide input data to the mobile device 100. The input data is communicated from the input device 212 to the processor 210.

As described above, the accelerometer module 214 may include an accelerometer 216. An accelerometer 216 is a device that can detect movement of the mobile device 100. The accelerometer 216 can output an accelerometer signal based on the movement, which can then be provided to the processor 210. It will be appreciated that the accelerometer 216 may be a digital accelerometer that outputs a digital accelerometer signal or an analog accelerometer that outputs an analog accelerometer signal. As will be discussed below, the accelerometer signal can be used by many different applications to provide information relating to the movement of the device.

When a user is using the input device 212 to enter sensitive input data, e.g., a password or login-gesture, an interloper can monitor the accelerometer signal to determine the letters or numbers that the user has entered. In the frequency domain of the accelerometer signal, the lower frequencies can provide information regarding the movements of the mobile device 100 about one or more axes. In some scenarios, the interloper can monitor a specific frequency or frequency range, e.g., lower frequencies, of the accelerometer signal to determine locations on the device that the user has pressed.

As discussed, the processor 210 can execute the one or more applications. For example, the processor 210 can execute the operating system 220 of the mobile device 100. The processor 210 may further execute, via the operating system 220, other applications, such as the authentication application 222, the third party application 224, the web browser application 226, and the GPS application 228.

The authentication application 222 may be an application for authenticating a user of the mobile device 100. The authentication application 222 can display a screen requesting that a user provide sensitive input data, e.g., a password or a predetermined gesture, to perform authentication of the user and provide access to the mobile device 100. The user can provide input data indicating the password or login information using the input device 212. The authentication application 222 receives the sensitive input data and verifies the user's login information based on the provided input data. During this input, an interloper can monitor the accelerometer signal outputted by the accelerometer 216 to determine the sensitive input data that the user has entered.

Other applications such as the web browser application 226 or the third party applications 224 may also request that the user provide sensitive input data, such as a password. For example, the user may utilize a third party application 224 or the web browser application 226 to access the user's banking information. In such a scenario, the user may be prompted to enter sensitive input data such as a username and password. In these scenarios, an interloper can monitor the accelerometer signal to determine the sensitive input data provided by the user.

In order to reduce the likelihood that the interloper is able to obtain sensitive input data, the operating system 220, executing on the processor 210, can monitor the various applications to determine whether one of the applications is requesting that the user enter sensitive user input data. For instance, the operating system 220 may detect that the authentication application 222 is displaying or about to display a login screen to the user, or that a third party application 224 or the web browser application 226 is operating in a "hide-text" mode. A hide-text mode can include mode that is executed when an application is requesting that sensitive input data be provided. In the hide-text mode, predetermined symbols such as stars or dots can be shown in a text input box on the touch display 104 rather than displaying the actual characters or numbers entered by a user. When the operating system 220 detects that the user has been prompted to provide sensitive input data, the operating system 220 may cause a portion of the accelerometer signal to be obscured. The portion of the accelerometer signal to be obscured can include certain frequency ranges of the accelerometer signal or the entire accelerometer signal. It is appreciated that while the foregoing is explained as being performed by the operating system 220, the techniques described herein can be performed by other applications or processes executing on the processor 210.

Figure 3:
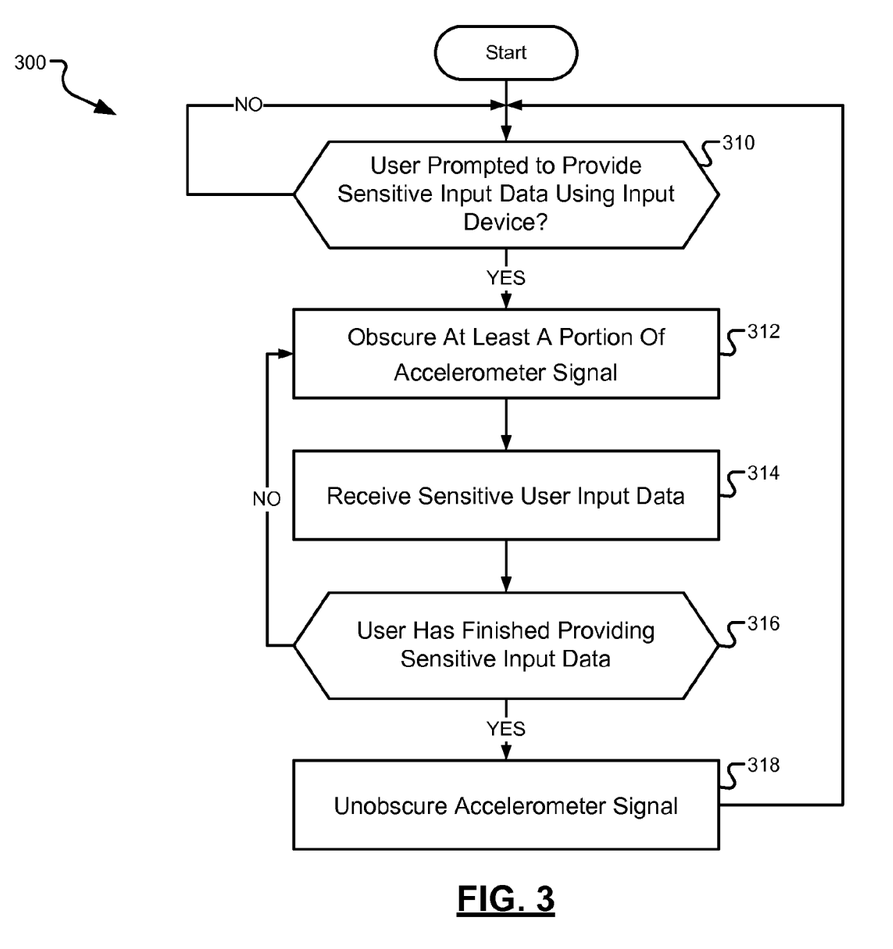
FIG. 3 is a flow chart illustrating an example technique for obscuring an accelerometer signal according to some implementations of the present disclosure.

Referring now to FIG. 3, an example technique 300 for obscuring an accelerometer signal is depicted. As shown at 310, the operating system 220 can determine whether a user has been prompted to provide sensitive input data to the mobile device 100 using the input device 212. The foregoing may be performed until the user is prompted to enter provide sensitive input data. Once the operating system 220 determines that an application has prompted the user to provide sensitive input data, the operating system 220 can perform an operation to obscure a portion of the accelerometer signal for a period during which the user is providing the sensitive input data, as shown at 312. For example, in some embodiments, the accelerometer signal can be obscured by: (i) switching the accelerometer 216 off, (ii) inserting a random noise signal into the accelerometer signal, (iii) masking the low-order bits of the accelerometer signal, (iv) passing the accelerometer signal through a filter, e.g., a high-pass filter, (v) actuating a vibrator of the mobile device 100, and/or (vi) otherwise degrading the accelerometer signal, e.g., reducing the sampling rate of the accelerometer.

The processor 210 can receive the sensitive input data from the user via the input device 212, as shown at 314. The operating system 220 can monitor the application requesting the sensitive input data to determine when the user has finished providing the sensitive input data, as shown at 316. Once the user has finished providing the sensitive input data, the operating system 220 can cease obscuring the accelerometer signal, as shown at 318. For example, when authentication is successfully performed on the authentication application 222, the web browser application 226 or third party application 224 (by receiving a user name and password combination) the operating system 220 may cease obscuring the accelerometer signal.

It is appreciated that the foregoing technique is provided for example only. Variations of the technique are contemplated and are within the scope of the disclosure.

Figure 4:
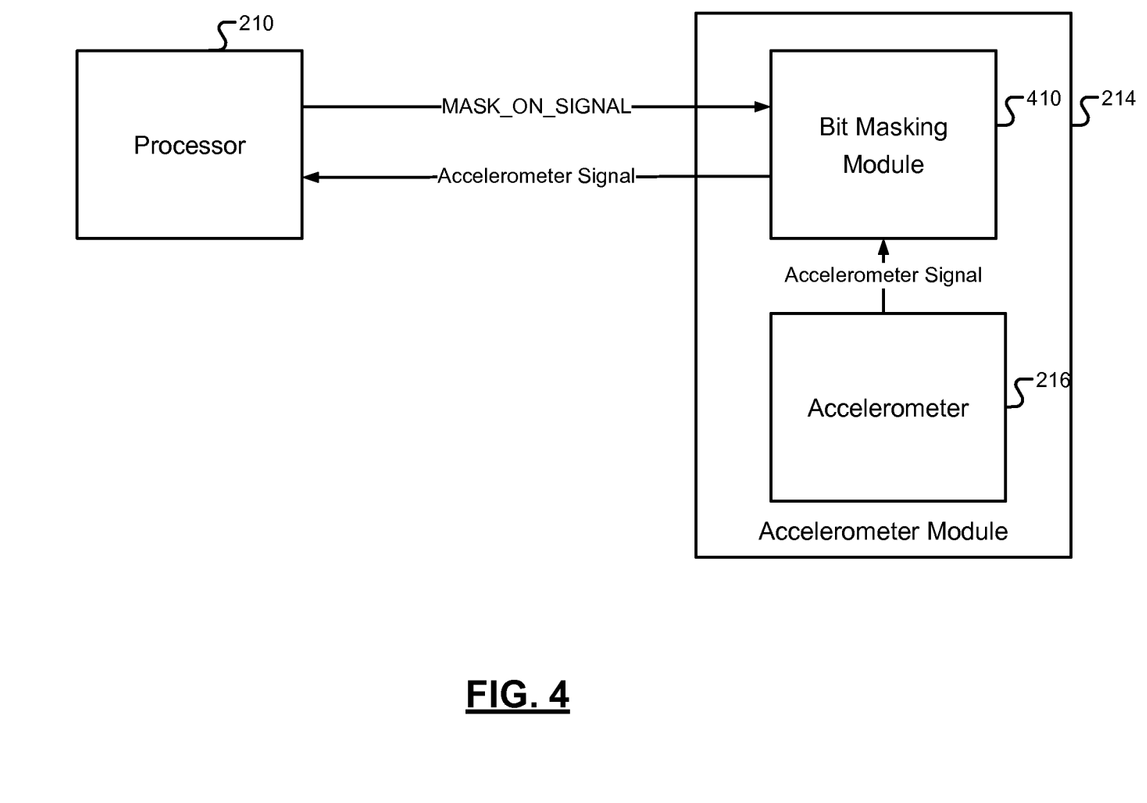
FIGS. 4 through 7 are functional block diagrams of a processor and an accelerometer module of a mobile device according to some implementations of the present disclosure.

Referring now to FIG. 4, a functional block diagram of a processor and an accelerometer module of a mobile device according to some implementations of the present disclosure is depicted. In the example, the accelerometer module 214 includes the accelerometer 216 and a bit masking module 410. The accelerometer 216 outputs a raw accelerometer signal that can be modified by the bit masking module 410 to obscure the accelerometer signal provided to the processor 210. It is appreciated that in this example, the accelerometer 216 may be a digital accelerometer that outputs a digital signal or an analog accelerometer with an analog-to-digital converter (not shown) interposed between the accelerometer 216 and the bit masking module 410. Upon determining that the user has been prompted to provide sensitive input data, the processor 210 can effect obscuring of a portion of the accelerometer signal by transmitting a signal, e.g., MASK_ON_SIGNAL, to the bit masking module 410 of the accelerometer module 214 indicating that the accelerometer signal is to be masked. The bit masking module 410 can apply a bit mask to the low-order bits of the accelerometer signal. For instance, the bit masking module 410 can mask the first byte with all 0s (e.g., Accelerometer Signal AND 0x00) or all 1s (e.g., Accelerometer Signal OR 0xFF). The masked accelerometer signal can then be provided to the processor 210, which may provide the accelerometer signal to a requesting application, e.g., the GPS application 228 or a third party application 224. Upon a determination that the user is no longer being prompted to enter sensitive input data, the processor 210 can cease transmitting the MASK_ON_SIGNAL, and the bit masking module 410 can cease applying the bit mask to the accelerometer signal.

It is appreciated that the bit masking module 410 can be alternatively configured to mask other bits, e.g., high-order bits or middle-order bits, instead of low-order bits. It is appreciated that the foregoing example is not intended to be limiting, and the example mobile device 100 may include additional or alternative components.

Figure 5:
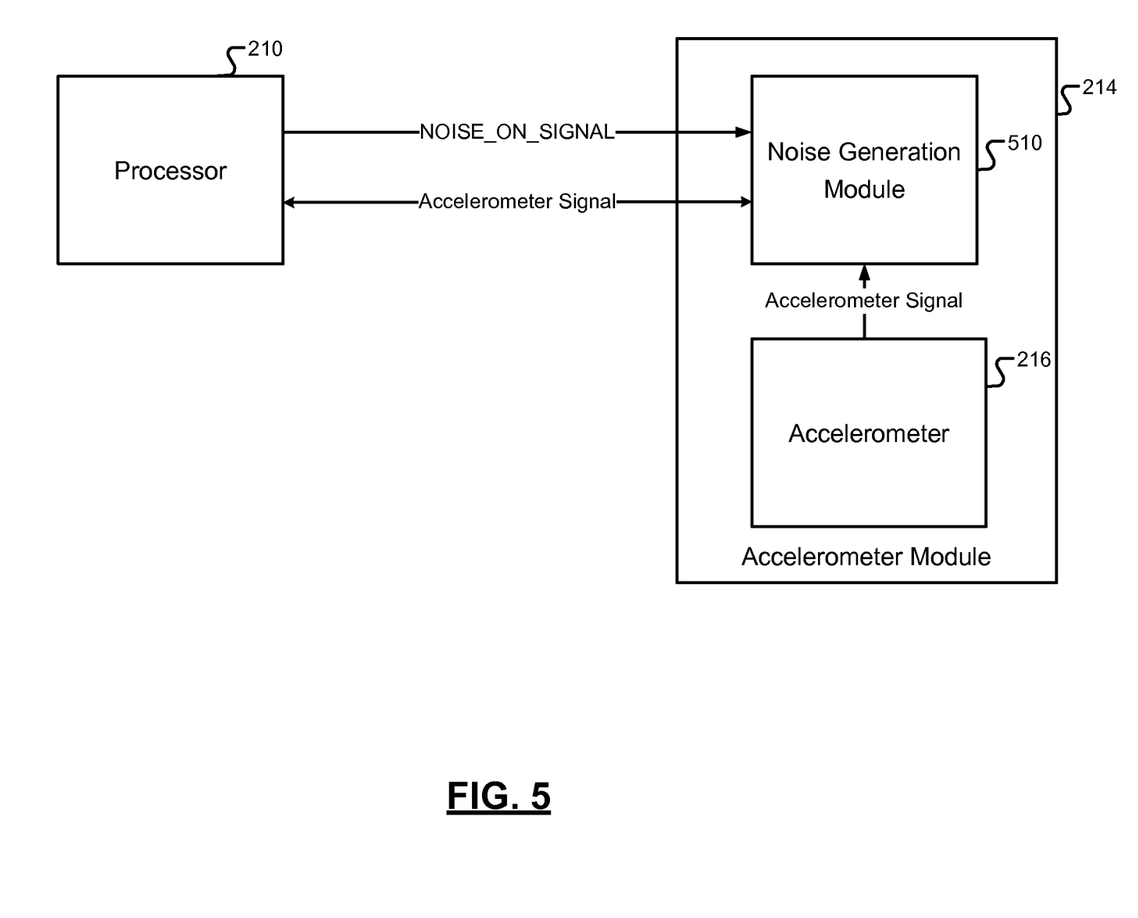

Referring now to FIG. 5, a functional block diagram of a processor and an accelerometer module of a mobile device according to some implementations of the present disclosure is depicted. In the example, the accelerometer module 214 includes the accelerometer 216 and a noise generation module 510. The accelerometer 216 outputs a raw accelerometer signal that can be modified by the noise generation module 510 to obscure the accelerometer signal provided to the processor 210. The accelerometer 216 can be a digital accelerometer that outputs a digital signal or an analog accelerometer that outputs an analog signal. The accelerometer signal can be provided to the processor 210 through the noise generation module 510. Upon determining that the user has been prompted to provide sensitive input data, the processor 210 can effect obscuring of a portion of the accelerometer signal by transmitting a signal, e.g., NOISE_ON_SIGNAL, to the noise generation module 510 of the accelerometer module 214, thereby indicating that a random noise signal is to be inserted into the accelerometer signal.

The noise generation module 510 can generate the random noise signal and insert the random noise signal into the accelerometer signal. For instance, the noise generation module 510 can include a random number generator that generates a random number. The noise generation module 510 can generate a random noise signal corresponding to the random number, and then insert the random noise signal into the accelerometer signal. In some embodiments, the random noise signal is a low frequency noise signal, such that only the low frequency portion of the signal is obscured. The frequency of the random noise signal can be selected so as to obscure the frequency range at which interlopers monitor the accelerometer signal. It is appreciated that the random noise signal may be inserted into the accelerometer signal in any suitable manner. For instance, the random noise signal may be inserted into the accelerometer signal using specific hardware, firmware, and/or software for inserting the random noise signal into the accelerometer signal, or any other suitable manner.

The accelerometer signal having the random noise signal inserted therein can then be provided to the processor 210, which in turn may provide the accelerometer signal to a requesting application, e.g., the GPS application 228 or a third party application 224. Upon a determination that the user is no longer being prompted to enter sensitive input data, the processor 210 can cease transmitting the NOISE_ON_SIGNAL and the noise generation module 510 can cease generating the random noise signal, thereby ceasing the obscuring of the accelerometer signal.

It is appreciated that the noise generation module 510 can be alternatively configured to generate a noise signal at other frequencies, thereby obscuring other portions of the accelerometer signal. It is appreciated that the foregoing example is not intended to be limiting, and the example mobile device 100 may include additional or alternative components.

Figure 6:
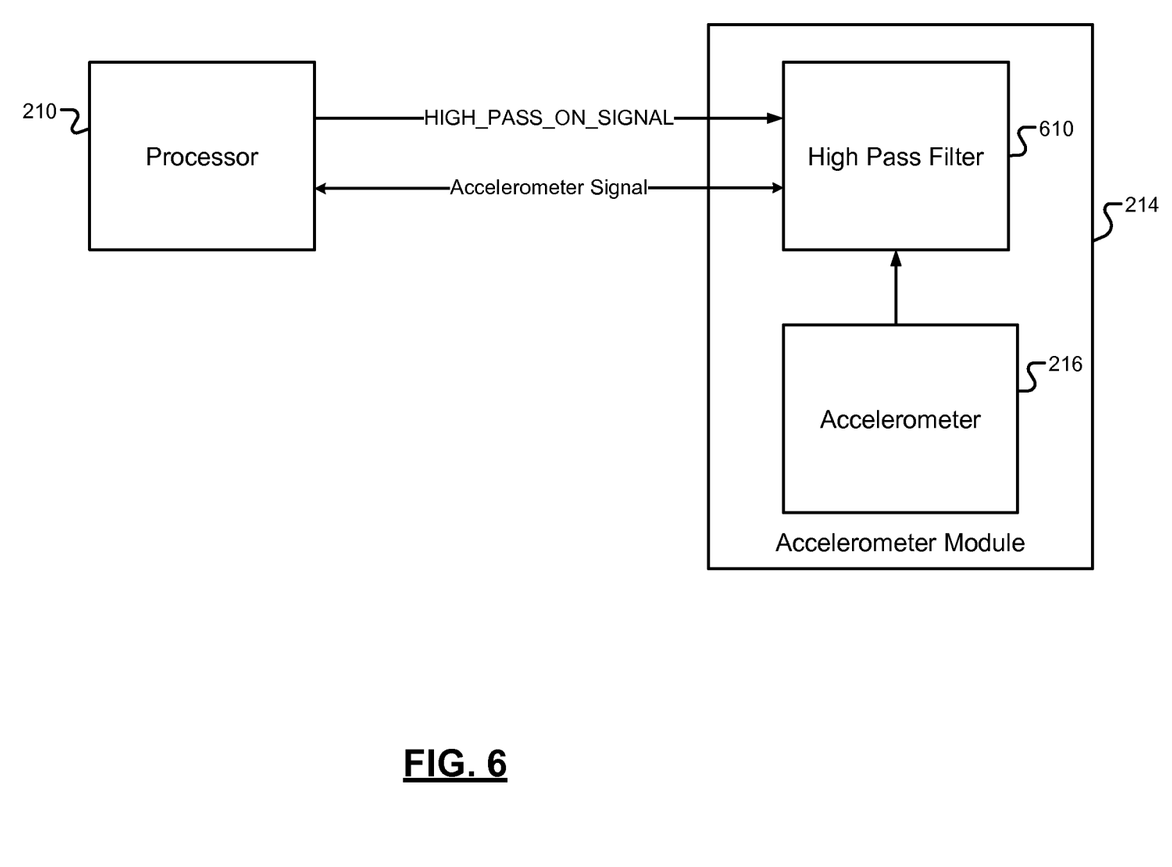

Referring now to FIG. 6, a functional block diagram of a processor and an accelerometer module of a mobile device according to some implementations of the present disclosure is depicted. In the example, the accelerometer module 214 includes the accelerometer 216 and a high-pass filter 610. The accelerometer 216 outputs a raw accelerometer signal that can be modified by the high-pass filter 610 to obscure the accelerometer signal provided to the processor 210. It is appreciated that in this example, the accelerometer 216 can be a digital accelerometer that outputs a digital signal or an analog accelerometer that outputs an analog signal. The accelerometer signal can be provided to the processor 210 through the high-pass filter 610. Upon determining that the user has been prompted to provide sensitive input data, the processor 210 can effect obscuring of a portion of the accelerometer signal by transmitting a signal, e.g., HIGH_PASS_ON_SIGNAL, to the high-pass filter 610 of the accelerometer module 214 indicating that the low frequencies of the accelerometer signal are to be filtered. The high-pass filter 610, upon receiving the HIGH_PASS_ON_SIGNAL, can filter the low-frequency portion of the accelerometer signal. The filtered accelerometer signal can then be provided to the processor 210, which may provide the accelerometer signal to a requesting application, e.g., the GPS application 228 or a third party application 224. Upon a determination that the user is no longer being prompted to enter sensitive input data, the processor 210 can stop transmitting the HIGH_PASS_ON_SIGNAL and the high-pass filter 610 can stop obscuring the accelerometer signal.

It is appreciated that a low-pass filter or band-pass filter can be used in lieu of or in combination with the high-pass filter. Further, the foregoing example is not intended to be limiting, and the example mobile device 100 may include additional or alternative components.

Figure 7:
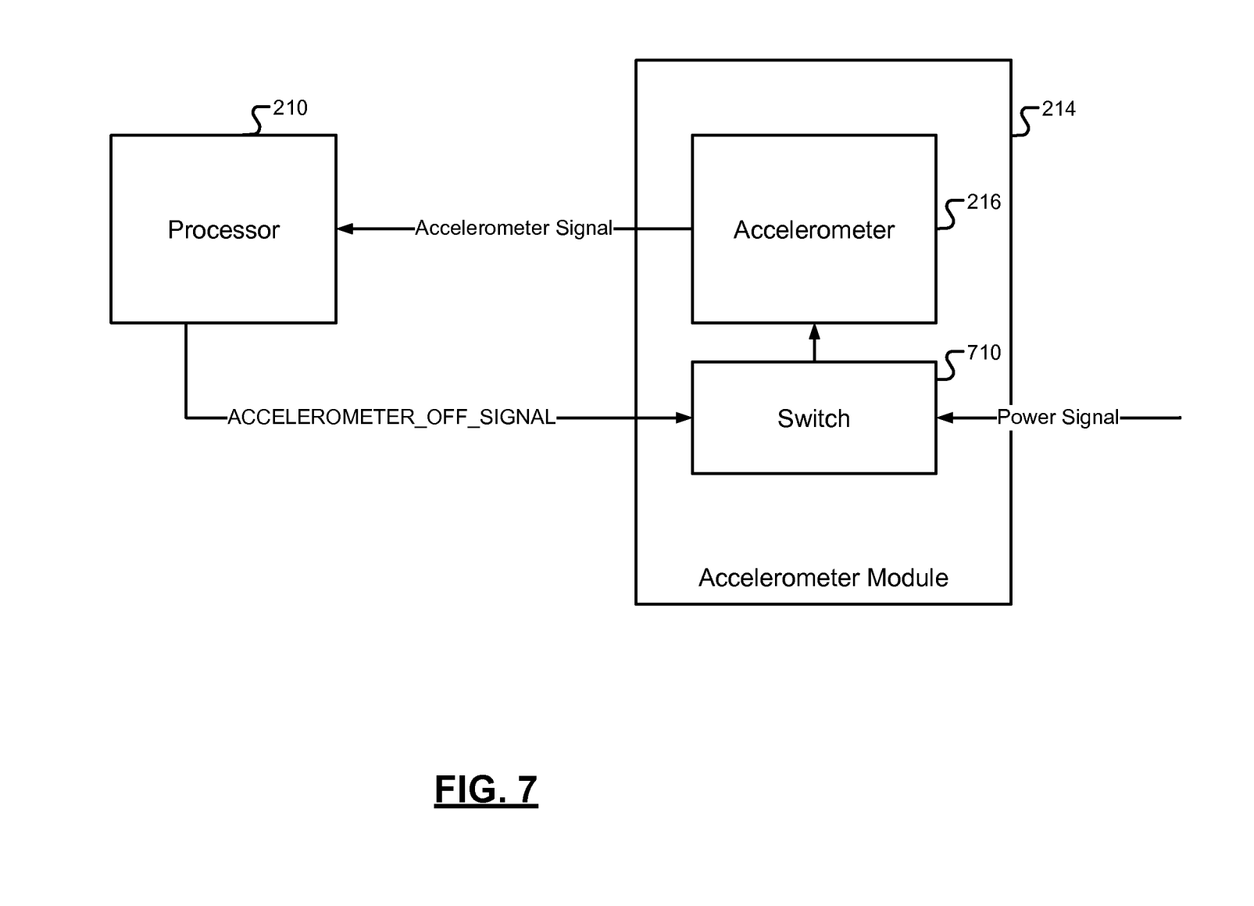

Referring now to FIG. 7, a functional block diagram of a processor and an accelerometer module of a mobile device according to some implementations of the present disclosure is depicted. In the example, the accelerometer module 214 includes the accelerometer 216 and a switch 710. It is appreciated that in this example, the accelerometer 216 can be a digital accelerometer that outputs a digital signal or an analog accelerometer that outputs an analog signal. The accelerometer 216 receives a power signal from a power source, e.g., a battery of the mobile device 100. The accelerometer signal can be provided to the processor 210 from the accelerometer 216. Upon determining that the user has been prompted to provide sensitive input data, the processor 210 can effect obscuring of a portion of the accelerometer signal by transmitting a signal, e.g., ACCELEROMETER_OFF_SIGNAL, to the switch 710 of the accelerometer module 214 indicating that the accelerometer is to be turned off, i.e., the power source removed for the period during which the user is providing sensitive input data. The switch 710, upon receiving the ACCELEROMETER_OFF_SIGNAL can open, such that the accelerometer 216 is turned off for the period during which the user is providing the sensitive input data. Upon a determination that the user is no longer being prompted to enter sensitive input data or has finished providing the sensitive input data, the processor 210 can stop transmitting the ACCELEROMETER_OFF_SIGNAL and the switch 710 can close, thereby allowing the power signal to be received by the accelerometer.

It is appreciated that the foregoing example is not intended to be limiting, and the example mobile device 100 may include additional or alternative components.

Figure 8:
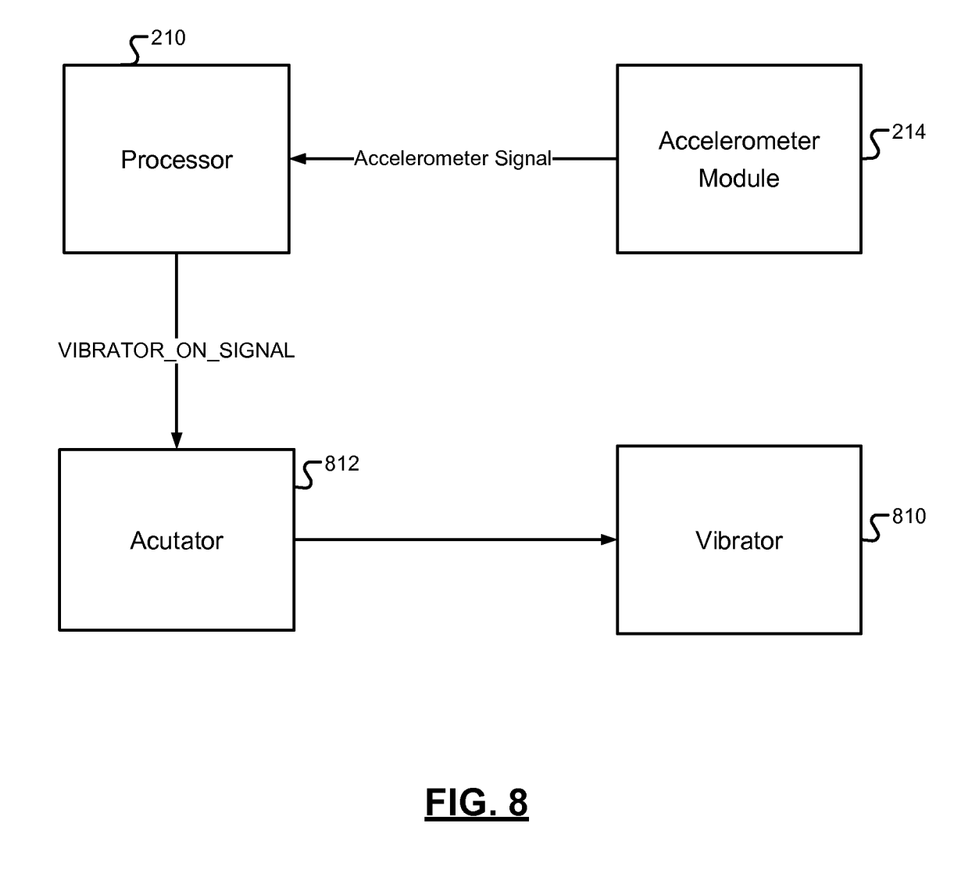
FIG. 8 is a functional block diagram of a processor, a vibrator, and an accelerometer module of a mobile device according to some implementations of the present disclosure.

Referring now to FIG. 8, a functional block diagram of a processor, a vibrator, and an accelerometer module of a mobile device is depicted. In the example, the mobile device 100 includes a vibrator 810 and an actuator 812. The vibrator 810 can be any suitable vibrator 810 ordinarily provided in a mobile device 100. The vibrator 810 may be used to vibrate the mobile device 100 when the mobile device 100 receives a message or a telephone call, or otherwise provide haptic feedback to a user. The accelerometer 216 can be a digital accelerometer that outputs a digital signal or an analog accelerometer that outputs an analog signal. The accelerometer signal can be provided to the processor 210 from the accelerometer 216. Upon determining that the user has been prompted to provide sensitive input data, the processor 210 can effect obscuring of a portion of the accelerometer signal by transmitting a signal, e.g., VIBRATOR_ON, to the actuator 812 indicating that the vibrator 810 is to be actuated, i.e., turned on. The actuator 812, upon receiving the VIBRATOR_ON signal can actuate the vibrator 810 for the period during which the user is providing the sensitive input data. In some embodiments, the vibrator 810 may be vibrated according to a random pattern, so as to further obscure the accelerometer signal, or according to a pattern or sequence that is effective at obscuring the accelerometer signal. Upon a determination that the user is no longer being prompted to enter sensitive input data or has finished providing the sensitive input data, the processor 210 can stop transmitting the VIBRATOR_ON signal and the actuator 812 stops actuating the vibrator 810. It is appreciated that the foregoing example is not intended to be limiting, and the example mobile device 100 may include additional or alternative components.

As discussed above, various other techniques may be implemented for obscuring the accelerometer signal. For instance, the processor 210 may be configured to adjust the power supply rails to a comparator circuit (not shown) of an analog-to-digital converter (not shown) of the accelerometer module 214 for the period during which the user is providing the sensitive input data. Further, the processor 210 may be configured to shunt the accelerometer signal to a ground for the period during which the user is providing the sensitive input data. Alternatively, the accelerometer signal may be sampled at a lower rate for the period during which the user is providing the sensitive input data.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known procedures, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The term "and/or" includes any and all combinations of one or more of the associated listed items. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

As used herein, the term module may refer to, be part of, or include an Application Specific Integrated Circuit (ASIC); an electronic circuit; a combinational logic circuit; a field programmable gate array (FPGA); a processor (shared, dedicated, or group) that executes code, or a process executed by a distributed network of processors and storage in networked clusters or datacenters; other suitable components that provide the described functionality; or a combination of some or all of the above, such as in a system-on-chip. The term module may include memory (shared, dedicated, or group) that stores code executed by the one or more processors.

The term code, as used above, may include software, firmware, byte-code and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The techniques described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are non-volatile memory, magnetic storage, and optical storage.

Some portions of the above description present the techniques described herein in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the described techniques include process steps and instructions described herein in the form of an algorithm. It should be noted that the described process steps and instructions could be embodied in software, firmware or hardware, and when embodied in software, could be downloaded to reside on and be operated from different platforms used by real time network operating systems.

The present disclosure also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a tangible computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatuses to perform the required method steps. The required structure for a variety of these systems will be apparent to those of skill in the art, along with equivalent variations. In addition, the present disclosure is not described with reference to any particular programming language. It is appreciated that a variety of programming languages may be used to implement the teachings of the present disclosure as described herein, and any references to specific languages are provided for disclosure of enablement and best mode of the present invention.

The present disclosure is well suited to a wide variety of computer network systems over numerous topologies. Within this field, the configuration and management of large networks comprise storage devices and computers that are communicatively coupled to dissimilar computers and storage devices over a network, such as the Internet.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A computer-implemented method comprising:
   determining, at a computing device including at least one processor and an accelerometer, that a user has been prompted to provide sensitive input data to the computing device;
   when the user has been prompted to provide sensitive input data to the computing device, beginning to obscure a portion of an accelerometer signal output from the accelerometer to obtain an obscured accelerometer signal; and
   receiving the sensitive input data from the user while the portion of the accelerometer signal is obscured.

2. The method of claim 1 further comprising:
   determining that the user has finished entering the sensitive input data; and
   ceasing to obscure the portion of the accelerometer signal when the user has finished entering the sensitive input data.

3. The method of claim 1, further comprising receiving, at the at least one processor, the obscured accelerometer signal.

4. The method of claim 1, wherein obscuring the portion of the accelerometer signal output from the accelerometer includes turning off the accelerometer, and wherein the obscured accelerometer signal comprises no signal.

5. The method of claim 1, wherein obscuring the portion of the accelerometer signal output from the accelerometer includes inserting a noise signal into the accelerometer signal to obtain the obscured accelerometer signal.

6. The method of claim 5, wherein the noise signal is based on one or more random numbers generated by a random number generator.

7. The method of claim 5, wherein the noise signal is a low-frequency range signal, and wherein the portion of the accelerometer signal that is obscured is a low-frequency range.

8. The method of claim 1, wherein obscuring the portion of the accelerometer signal output from the accelerometer includes actuating a vibrator of the mobile device.

9. The method of claim 1, wherein obscuring the portion of the accelerometer signal output from the accelerometer includes filtering the accelerometer signal.

10. The method of claim 9, wherein filtering the accelerometer signal includes applying a bit mask to the accelerometer signal.

11. A computing device comprising:
an input device configured to receive input data from a user;
an accelerometer module including an accelerometer; and
a processing device in communication with the input device and the accelerometer module and configured to determine whether the user has been prompted to provide sensitive input data to the computing device using the input device, and, when the user has been prompted to provide the sensitive input data to the computing device, to begin obscuring of a portion of an accelerometer signal output by the accelerometer to obtain an obscured accelerometer signal.

12. The mobile device of claim 11, wherein the processing device is further configured to determine that the user has finished entering the sensitive input data and to cease to obscure the portion of the accelerometer signal upon determining that the user has finished entering the sensitive input data.

13. The mobile device of claim 11, wherein the accelerometer module further includes a bit masking module that receives the accelerometer signal from the accelerometer and masks one or more low-order bits of the raw accelerometer signal to obtain the obscured accelerometer signal.

14. The mobile device of claim 13, wherein the accelerometer is a digital accelerometer and the accelerometer signal is a digital signal having a predetermined amount of bits, including the low-order bits.

15. The mobile device of claim 11, wherein the accelerometer module further includes a noise generation module configured to insert a noise signal into the accelerometer signal to obtain the obscured accelerometer signal.

16. The mobile device of claim 15, wherein the noise signal is a low frequency range signal, and wherein the portion of the accelerometer signal that is obscured is a low-frequency range.

17. The mobile device of claim 11, wherein the accelerometer module further includes a switch that selectively turns off the accelerometer to obscure the accelerometer signal, wherein the obscured accelerometer signal comprises no signal.

18. The mobile device of claim 11, wherein the processing device includes one or more processors.

19. A computer-implemented method comprising:
determining, at a processing device of a computing device, that a user has been prompted to provide sensitive input data to the computing device;
when the user has been prompted to provide sensitive input data to the computing device, beginning to obscure a portion of an accelerometer signal output from an accelerometer of the computing device to obtain an obscured accelerometer signal;
receiving, at the processing device, the obscured accelerometer signal;
receiving the sensitive input data from the user while the portion of the accelerometer signal is obscured;
determining, at the processing device, that the user has finished entering the sensitive input data; and
ceasing to obscure the portion of the accelerometer signal when the user has finished entering the sensitive input data.

20. The method of claim 19, wherein the processing device includes one or more processors.

21. The method of claim 19, wherein obscuring the portion of the accelerometer signal output from the accelerometer includes inserting a noise signal into the accelerometer signal to obtain the obscured accelerometer signal.

22. The method of claim 21, wherein the noise signal is based on one or more random numbers generated by a random number generator.

23. The method of claim 21, wherein the noise signal is a low-frequency range signal, and wherein the portion of the accelerometer signal that is obscured is a low-frequency range.

24. The method of claim 19, wherein obscuring the portion of the accelerometer signal output from the accelerometer includes actuating a vibrator of the mobile device.

25. The method of claim 19, wherein obscuring the portion of the accelerometer signal output from the accelerometer includes filtering the accelerometer signal.

26. The method of claim 25, wherein filtering the accelerometer signal includes applying a bit mask to the accelerometer signal.

* * * * *